(12) United States Patent
Huang

(10) Patent No.: US 7,589,781 B2
(45) Date of Patent: Sep. 15, 2009

(54) AUTOMATIC FOCUS FOR IMAGE SENSORS

(75) Inventor: Xiaolin Huang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 674 days.

(21) Appl. No.: 11/044,137

(22) Filed: Jan. 26, 2005

(65) Prior Publication Data

US 2006/0164934 A1 Jul. 27, 2006

(51) Int. Cl.
*H04N 5/228* (2006.01)
*H04N 5/232* (2006.01)
*G03B 13/00* (2006.01)
*G03B 17/00* (2006.01)

(52) U.S. Cl. .............. 348/355; 348/345; 348/348; 348/349; 348/354; 348/356; 348/222.1; 396/79; 396/80

(58) Field of Classification Search ......... 348/345–357, 348/208.12, 207.99, 208.16, 222.1; 369/44.11
See application file for complete search history.

(56) References Cited

U.S. PATENT DOCUMENTS

| | | | |
|---|---|---|---|
| 4,928,170 A | 5/1990 | Soloveychik et al. | |
| 5,644,519 A | 7/1997 | Yatim et al. | |
| 6,151,415 A | 11/2000 | Acharya et al. | |
| 6,441,855 B1 | 8/2002 | Omata et al. | |
| 6,563,543 B1 | 5/2003 | Doron | |
| 7,158,182 B2 * | 1/2007 | Watanabe et al. | 348/345 |
| 7,187,413 B2 | 3/2007 | Alderson | |
| 7,327,395 B2 | 2/2008 | Nobuoka | |
| 7,403,230 B2 | 7/2008 | Yasuda | |
| 2001/0017619 A1 * | 8/2001 | Takeuchi | 345/204 |
| 2003/0048373 A1 * | 3/2003 | Okisu et al. | 348/350 |
| 2004/0017502 A1 | 1/2004 | Alderson | |
| 2004/0119871 A1 | 6/2004 | Nobuoka | |
| 2004/0227843 A1 * | 11/2004 | Watanabe | 348/354 |
| 2004/0234153 A1 | 11/2004 | Nakami | |
| 2005/0007486 A1 * | 1/2005 | Fujii et al. | 348/345 |
| 2005/0052564 A1 * | 3/2005 | Ishii | 348/345 |
| 2005/0083428 A1 * | 4/2005 | Ohkawara | 348/345 |
| 2005/0083429 A1 * | 4/2005 | Yasuda | 348/345 |
| 2005/0212950 A1 * | 9/2005 | Kanai | 348/345 |

OTHER PUBLICATIONS

European Search Report; Application No. EP 06 25 0389; May 3, 2006; 11 pages; European Patent Office.
EP 06 25 0389, European Search Report and Written Opinion, Apr. 24, 2006.

* cited by examiner

*Primary Examiner*—Jason Chan
*Assistant Examiner*—Michael Osinski
(74) *Attorney, Agent, or Firm*—Blakely Sokoloff Taylor & Zafman LLP

(57) ABSTRACT

The embodiments of the invention relate to automatic focusing methods and apparatus suitable for use in digital imaging devices. The proposed methods and apparatus evaluate the focus condition of the optical system by evaluating the digitized image, without requiring additional hardware besides the digital image-capture signal flow path. A method for computing the appropriate direction and magnitude of optical system adjustment, based on the evaluated focus condition, is provided. The computed quantities are communicated to the lens driving apparatus to reposition and adjust the optical system and to incrementally obtain a better focus. Upon reaching a desired focus quality, the device is prevented from controlling the lens driving apparatus.

9 Claims, 5 Drawing Sheets

Auto-focus Architecture

Auto-focus Architecture

Tracking State Machine

AUTOMATIC FOCUS FOR IMAGE SENSORS

TECHNICAL FIELD

The embodiments of this invention relate generally to digital imaging, and more specifically, relate to architectures and methods for the automatic focusing of digital imaging devices.

BACKGROUND

In general, digital imaging devices may be one of two types: automatic focus (auto-focus) and fixed-focus. The fixed-focus devices usually are incapable of affecting lens or changing the aperture and, in stead, rely on a large depth of field where the object appears to be in focus. Although acceptable in many cases, the images captured by fixed-focus devices are not as sharp as those captured by auto-focus devices.

Images captured at the focal point of a lens will be in sharp focus, where the focal point is defined as the point on the axis of the camera lens at which light rays converge or appear to converge. However, an adequately sharp image can be produced, provided the object is within the depth of field of the lens. The depth of field is a range of distance from a camera within which the captured image of an object is sufficiently focused. Thus, relative to the lens, the depth of field is a range of area spanned both sides of the exact focal point.

There are different methods and associated apparatus to automatically focus a digital imaging device. In one method the lens is moved in a direction that increases the intensity of the light on light sensing elements and is stopped after the maximum intensity is achieved. Another automatic focusing technique relies upon finite impulse response (FIR) filters to determine the edge features and their sharpness. Such a technique is less effective in case of images with widely varying intensity/color values, since averaging distorts results.

The prior art abounds with auto-focus control circuits and apparatus, many of which employ means of measuring the distance from the object of interest and map it to some measurable quantity that drives the optical system to arrive at the correct focus. This method of auto-focusing is performed in parallel to the main imaging path, which is ideal for film-based cameras.

As digital imaging devices become dominant in the market, auto-focusing means rely mainly on the data obtained from the main imaging data path. The basic assumption is that the best focus condition is achieved when the image contains the maximum amount of high frequency information, measured by applying digital filtering to a portion of the digitized image data. The computed energy of the filtered spectrum is employed as a measure of frequency content.

While superior in many cases, auto-focus digital imaging devices are more complicated in terms of hardware, more expensive to manufacture, and slower in operation than fixed-focus devices. It is desirable to provide auto-focusing with minimum cost and minimum additional space, and to be able to utilize existing components of an imaging device without adding dedicated components for automatic focusing.

DETAILED DESCRIPTION

In the following description, several specific details are presented to provide a thorough understanding of the embodiments of the invention. One skilled in the relevant art will recognize, however, that the invention can be practiced without one or more of the specific details, or in combination with or with other components, etc. In other instances, well-known implementations or operations are not shown or described in detail to avoid obscuring aspects of various embodiments of the invention. Even though different aspects of this invention are mostly presented in the context of digital still cameras, they can be applied to any digital image capturing system and apparatus, and the description of the invention is not intended to limit its applicability to any particular field of usage.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Embodiments of the invention relate to automatic focusing methods and apparatus for use in digital imaging devices. The proposed methods and apparatus evaluate the focus condition of the optical system by evaluating the digitized image, without requiring any additional hardware besides the digital image-capture signal flow path. This application discloses a method, based on the evaluated focus conditions, for computing the direction and the magnitude of the lens movement. In this method, the computed quantities are communicated to the lens-driving-apparatus for incremental adjustment of the optical system and attainment of a better focus. Upon reaching a desired focusing quality, the device is prevented from controlling the lens-driving-apparatus.

Figure 1:
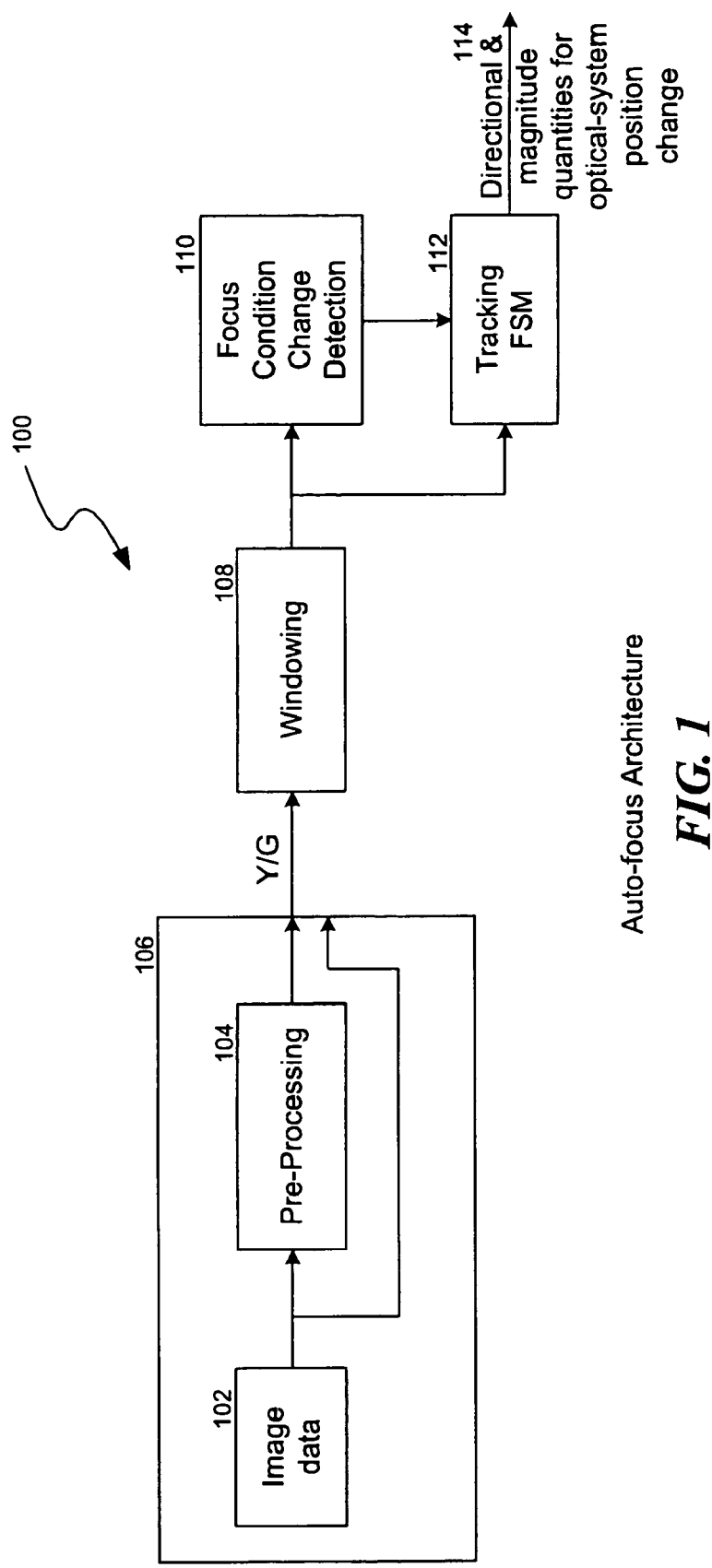
FIG. 1 is a high-level schematic diagram of an auto-focus process, according to an embodiment of this invention.

The embodiments of this invention set forth simple digital auto-focus methods and apparatus that provide fast response time. FIG. 1 is a schematic diagram of an auto-focus process 100, according to an embodiment of this invention, which is flexible for implementation in various imaging applications. A unique method is provided for measuring the frequency content of a captured image. For best focus, in a computationally cost effective manner, the proposed method iteratively approximates the optimal lens position. The method pertains to a non-linear control method to control the optical system driver, which has low complexity while being highly effective for both video and still imaging applications and can be used in any digital imaging device that employs focus adjustable lenses.

As illustrated in FIG. 1, the raw image data 102, captured by a two dimensional array of light sensors, or the pre-processed image data 104, from the primary image capturing device 106, is fed into the windowing unit 108, which computes values quantifying the quality of the current focus state. The quantified focus state values are subsequently utilized by the focus condition change detection circuit 110 to compute an out-of-focus indicator value.

The quantified focus state values and the out-of-focus indicator values are employed by the tracking state-machine 112 to compute a set of directional and magnitude quantities 114 for driving the optical system towards a better focusing position. The out-of-focus indicator values determine whether or not the optical system needs to be driven. They enable or disable the tracking state-machine 112 from computing the directional and magnitude quantities 114 or from sending these quantities to the lens driving apparatus.

Figure 2:
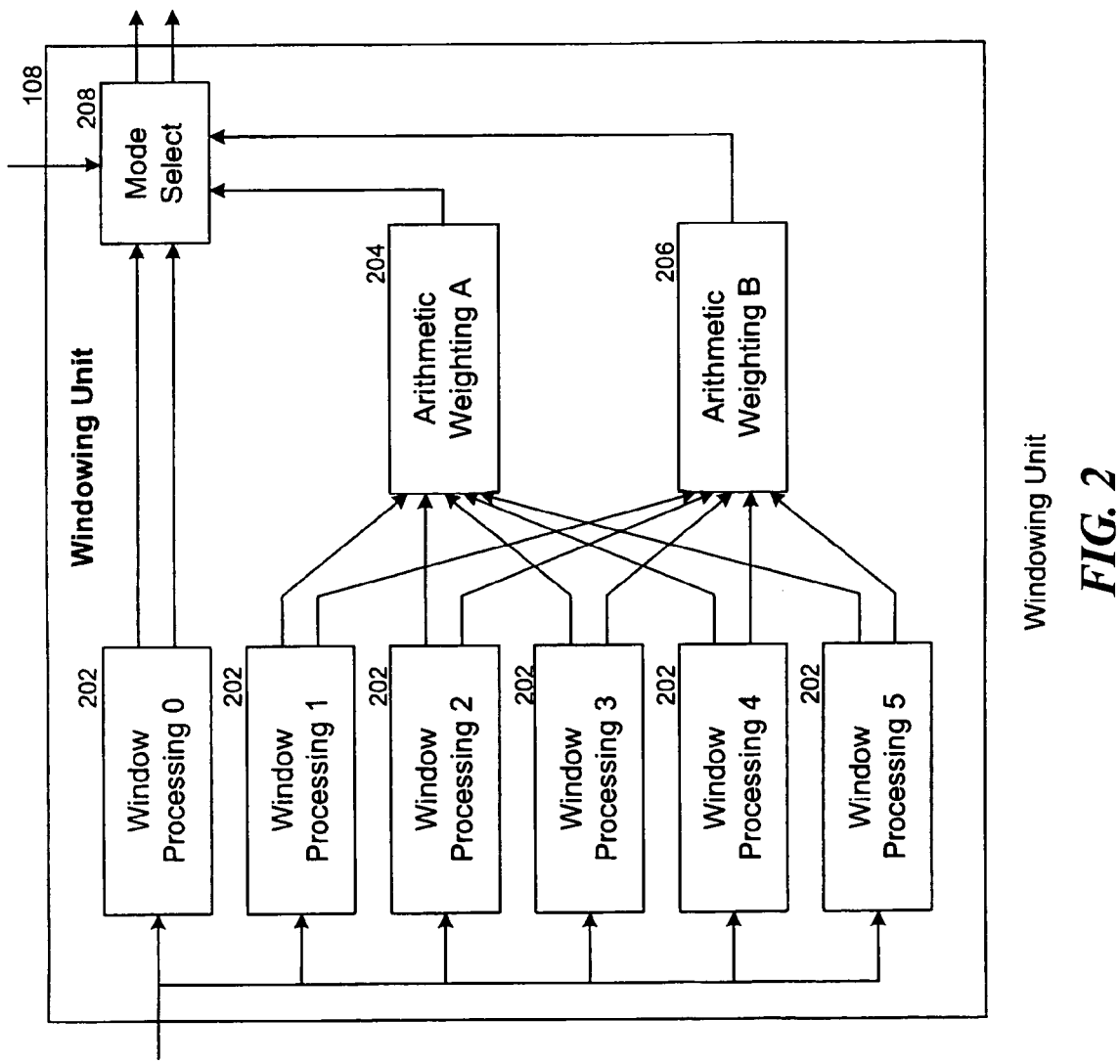
FIG. 2 is a block diagram of processes performed by the windowing unit depicted in FIG. 1, according to another embodiment of the invention.

FIG. 2 is a block diagram of the processes performed by the windowing unit 108. The primary task of the windowing unit 108 is to compute values that suitably describe the focus state. The values that correspond to the desired focus state are not absolute and may vary under different imaging environments. The windowing unit 108 is comprised of a number of window processing circuits 202, each of which only processes the data from an assigned region of the image. Each assigned region is defined by location and size parameters that are programmable.

In one embodiment the region is rectangular in shape and is typically located such that the region fits within the image (i.e. no portions of the region lies outside the image). In another embodiment the size is 64×32 and can be variable up to the full length and the width of the image. Regions can be of different sizes. Regions may also overlap each other within an image depending on the needs of the application developer. The relative importance of each region is determined by its weighting function.

Typically 6 or less window processing circuits 202 are needed for practical applications. However, the user/application-developer can decide on the number of circuits 202. For example the user may find that only 2 window processing circuits are required and that the user will apply zero weights to the remaining 4. The more window processing circuits there are the more flexible it is for the application developers.

The mode select unit 208 distinguishes Window Processing 0 from the remaining Window Processing units 202, 1 to 5. It is introduced as a flexible means for application developers to differentiate weighted window processed results from multiple regions from non-weighted window processed results from a single region defined by Window Processing unit 0. For instance, Window Processing unit 0 may be defined to include the entire image whereas Window Processing 1-5 may be defined by small non-overlapping regions within the image. An example of a situation where Window Processing unit 0 is selected over the remaining Window Processing units is a change in focus, which may cause the small windows to loose effectiveness in tracking focus. Window Processing unit 0 may then be selected to extract a more general focus condition based on a larger window size. What section of the image goes to the Window Processing 0 is specified by the application developer; however, it can be up to the entire image.

Figure 3:
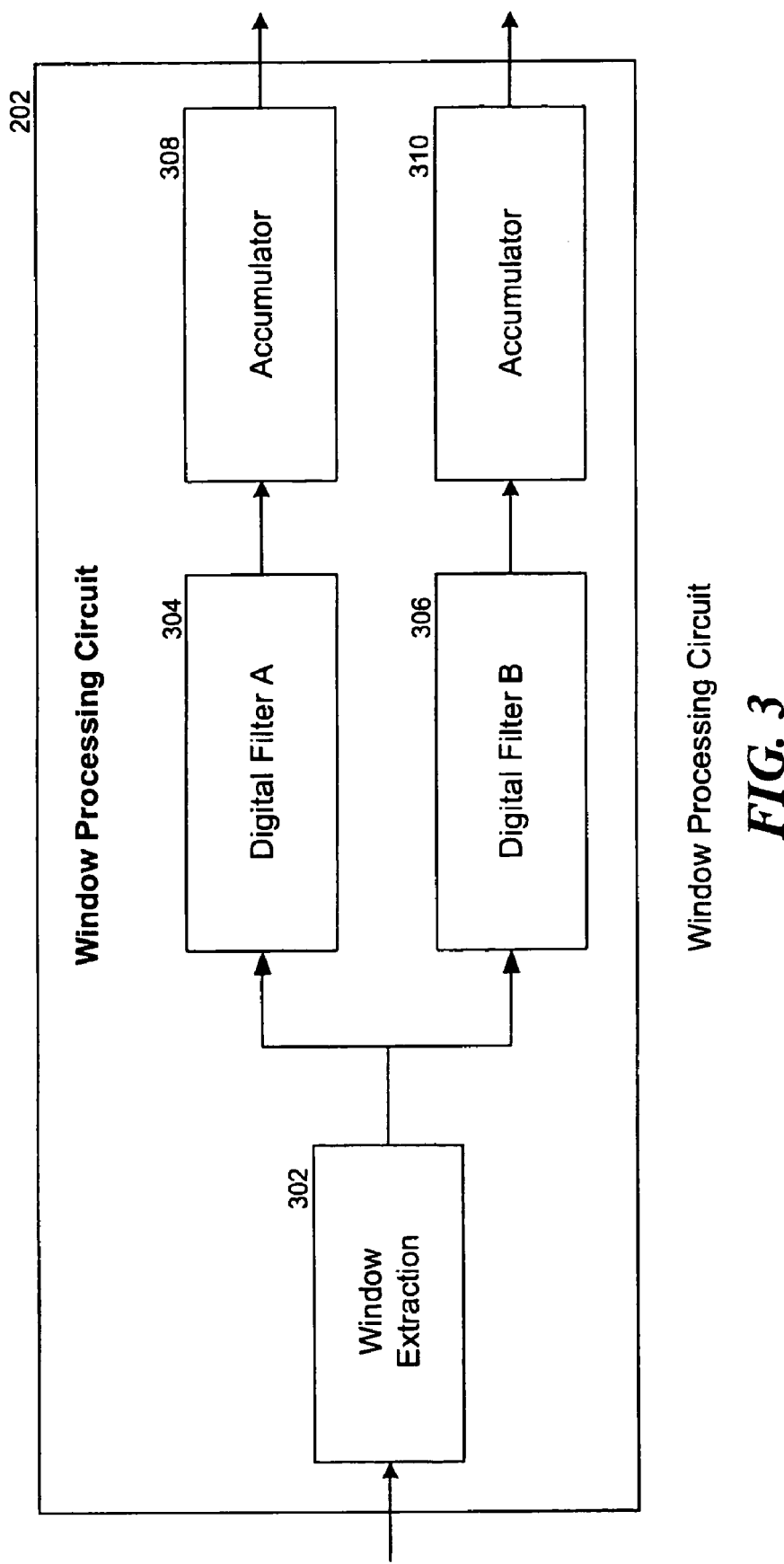
FIG. 3 illustrates the window processing circuit depicted in FIG. 1, according to yet another embodiment of this invention.

FIG. 3 illustrates the processing architecture of the window processing circuit 202. The window extraction circuit 302 determines when to extract pixel data corresponding to its assigned region from the main image data stream. If a pixel is determined to belong to the pre-specified region, then it is retained and fed to the digital filters A (304) and B (306). Otherwise, it is ignored in all subsequent processes. Each of the two digital filters 304 and 306 can be programmed with filtering coefficients selected from a set of digital filter coefficients. Filters A and B are programmed by the application developer to extract different spectral information of the image where one may be more sensitive to high frequency image data and the other may be more sensitive to low frequency image data. The outcomes of both filters are used by the focus condition change detection unit. But the tracking state machine uses only the outcome of one of the filters.

The digital filters are the primary means of evaluating focus condition and extract and evaluate certain frequency components of the image region. In one embodiment the filters are one dimensional filters and filter only in the "horizontal" direction (if the image data is scanned in a horizontal raster scan order). They involve a finite number of filter taps, such as 3 to 15 taps,(e.g., [−1 0 2 0 −1]) and they are programmable. In this embodiment the filters are FIR filters which means that each window processed data is first stored in a delay chain. The FIR filter taps are then multiplied by the corresponding delayed data in the chain and the multiplication results are accumulated to produce the filter results. A digitally filtered data sequence is then accumulated in accumulators 308 and 310, as illustrated in FIG. 3, until the entire region is processed. The final accumulated sums are provided as outputs of the window processing circuit 202.

The final accumulated sums from each of the window processing circuits 202 are then arithmetically weighted in the two arithmetic weighting units A (204) and B (206), to produce a weighted accumulated sum. These weighting units 204 and 206 are distinguished by their digital filter type. Arithmetic weighting unit A (204) is associated with final accumulated sums produced from the digital filter A (304) filtered sequence. Similarly, the arithmetic weighting unit B (206) is associated with digital filter B (306). These two weighted accumulated sums give an overall measure of the image statistics, which are used to quantify the "activity" of the image region (the scene) utilized by the focus condition change detection circuit 110, and to quantify the focus quality utilized by the tracking state machine 112. Each filter results are multiplied by a weight and the weighted results are summed. So the weighting is actually a weighted sum, not an array of multiply weighted results. The weights are programmable are tuned by the application developers. The tuning process is one where the best focus tracking is achieved. The weights directly affect the tracking performance. Since these weights are programmable, they can either be hard-coded into the design or if the application developers wish, they can generate the weights using additional processing on the image and feed the desired weights back to the focus tracking module.

Figure 4:
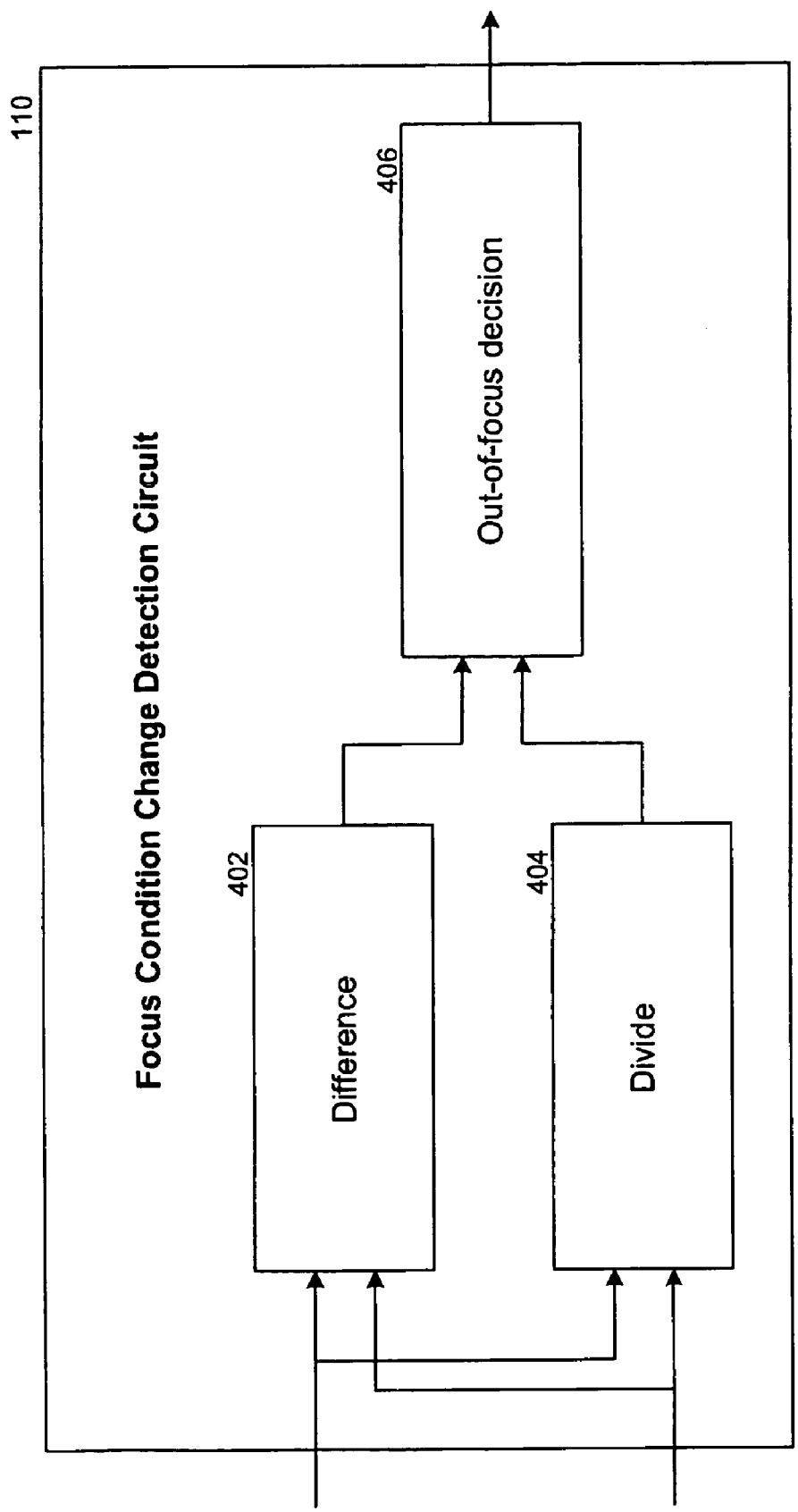
FIG. 4 illustrates the focus condition change detection circuit depicted in FIG. 1, according to yet another embodiment of this invention.

FIG. 4 illustrates the process architecture of the focus condition change detection circuit 110. The two final accumulated sums from the windowing unit are sent to a difference circuit 402 and a divide circuit 404. These circuits first perform a pre-scaling of the final accumulated sums and then subtract and divide the two final accumulated sums, respectively. Pre-scaling simply throws out (truncates/rounds) excess bits so that the resulting value is aligned properly before performing difference or division, and is primarily to align the results between Arithmetic Weighting A and Arithmetic Weighting B. The scaling is only applied to one of the two arithmetic weighting units. The out-of-focus decision circuit 406 then makes a decision on the focus condition by evaluating the relative magnitudes of the difference and division results and by comparing them to a pre-defined threshold value.

As the lens moves, the focus condition changes. This causes the two weighted sums, A and B, to also change. Each set of changes can be traced out as a curve (e.g., a Gaussian curve). Ideally, when the lens is out-of-focus, the sums A and B will return low values and when the lens is approaching the focus point, the two sums will return their maximum values. However, depending on the image characteristics, the two curves will contain a significant amount of noise, even at the focus point. To deal with the noise, two sets of filters, A and B, are employed. The use of two different filters implies that the two curves (being sensitive to different spectral contents) will have different amplitudes. This allows taking the difference and the ratio between the two curves. Using two curves and taking their difference and ratio makes the method more robust against noise from focus tracking.

Figure 5:
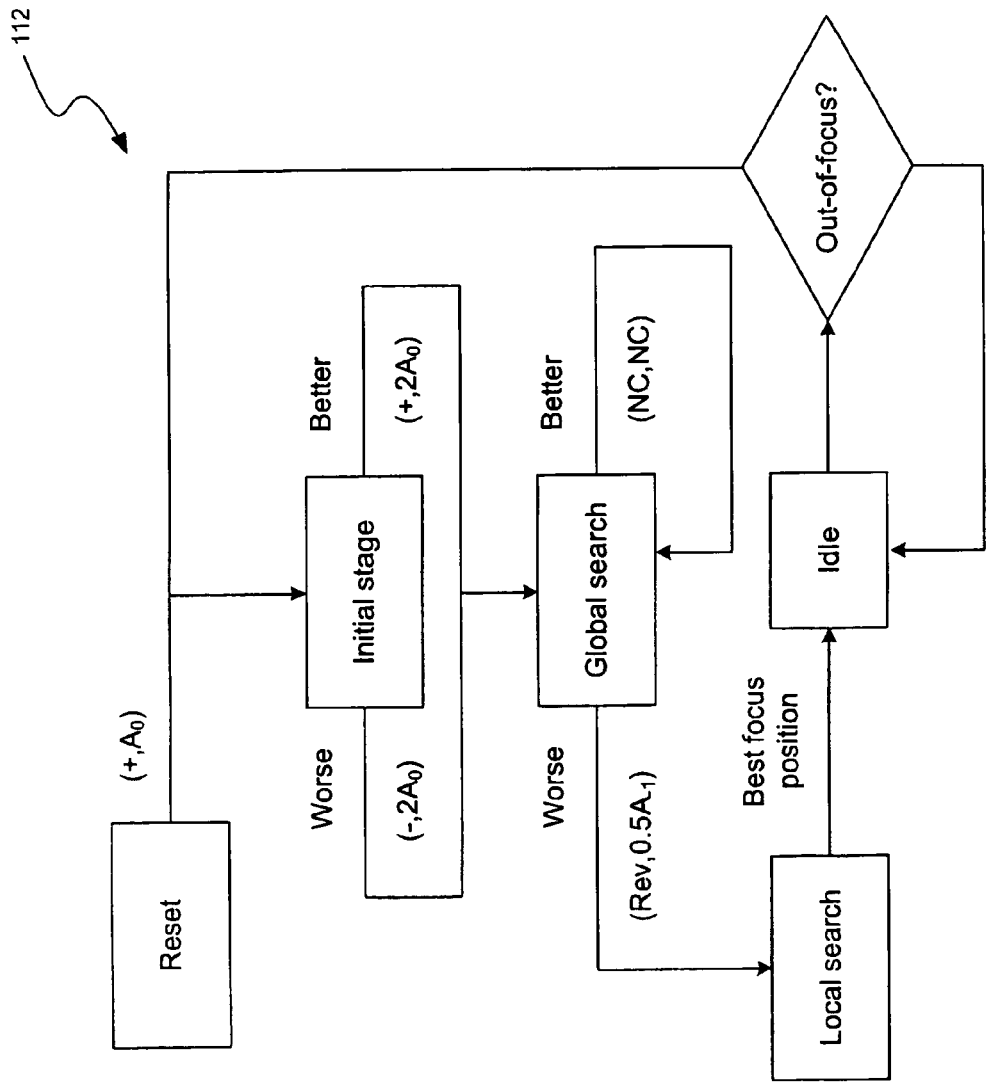
FIG. 5 illustrates a control flow diagram of the tracking state-machine depicted in FIG. 1, according to another embodiment of this invention.

FIG. 5 depicts the control flow diagram of the tracking state-machine 112, which keeps track of up to two previous positions by storing their corresponding tracking state information in memory. Based on the current state and the stored state information, the tracking state machine 112 calculates the desired direction and magnitude of the lens adjustment. The stored state information includes the weighted accumulated sum associated with digital filter B from the windowing unit, the previously computed direction and magnitude quantities, and the out-of-focus indicator values.

An example of the focus tracking process is presented in the following paragraphs. In summary, the computation of the desired direction is based on comparing the weighted accumulated sum of the current position with the weighted accumulated sum of adjacent tracking positions (i.e. the previous 1 or 2 positions). It is the previous direction if the lens has been moving in the same direction for the previous 2 positions. Otherwise, if the lens reversed its direction, then there is a possibility of having one position to the left and one position to the right of the current position. The direction is adjusted such that the weighted accumulated sum approaches a maximum value. The magnitude is adjusted based on two assumptions: (1) that none of the previous positions visited is visited again (unless there is a focus condition change), and (2) that the lens is brought to the optimal focus point (lens adjustment magnitudes may reduce when approaching optimal focus).

After initial power-on of the device, the tracking state-machine 112 is reset to a neutral state in which the lens is placed in a middle (or relaxed) position. The tracking state information for this position is then computed and stored in memory. A positive step (corresponding to a positive direction and a non-zero magnitude quantity) is then applied to the lens-driving-apparatus. The tracking state for this new position is then computed and stored in memory. Information from the two states, the current and the initial information, are then used to calculate the desired direction and magnitude quantities for adjusting the lens position. A positive direction is chosen as the desired direction if the current position results in better focus quality. Otherwise, a negative direction is chosen. The desired magnitude quantity in this step is typically double that of the previous magnitude quantity.

As the lens is repositioned, a new weighted accumulated sum is calculated. At this stage the tracking state-machine 112 operates in the "Global Search" mode. The process of the determination of the desired direction remains the same but it is different for the magnitude quantities. If the current position results in better focus quality, both desired direction and magnitude quantities remain the same. If not, the desired direction is reversed and the magnitude quantity is reduced by a half. In the latter case, the next lens position will be situated between the current lens position and the previous lens position.

The condition for reversing the search direction, illustrated in FIG. 5, is a simple condition based on comparing the current weighted accumulated sum against a previously stored weighted accumulated sum. More elaborate conditions may also be implemented to reduce the amount of "overshoot" during global search in which the lens is driven past the optimal focal point. Such conditions may utilize information from other properties of the image sequence measured at different times.

When the lens is repositioned, a new weighted accumulated sum is calculated and the tracking state-machine 112 operates in the "Local Search" mode. The main characteristic of this search mode is that, during the update, if the current position does not have a better focus quality than the previous positions, then the tracking state information of the best focus position is kept. On the other hand, if the current position has the best focus quality, then the previous tracking state information is discarded and only the current tracking state information is stored.

The direction and magnitude quantities are determined to approach the optimal focus point by comparing the current tracking state information against the tracking state information having the best focus quality. After the best focus position has been determined through Local Search, the tracking state-machine 112 is placed in the Idle mode and remains in the Idle mode until an out-of-focus signal is generated by the focus condition change detection unit 110.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. When the claims use the word "or" in reference to a list of two or more items, that word covers all of the following interpretations of the word: any of the items in the list, all of the items in the list, and any combination of the items in the list.

The above detailed description of the embodiments of the invention is not intended to be exhaustive or to limit the invention to the precise form disclosed above nor to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. An automatic focusing apparatus as a part of a digital imaging device, the apparatus comprising:

an optical system capable of forming an image of an object at a focal plane of the optical system;

a two dimensional away of light sensors for generating pixel data representing the image;

a windowing facility cooperating with a plurality of filter taps, the windowing facility being configured for:

extracting the pixel data of at least one region of the image using a first finite impulse response (FIR) filter to derive first spectral information and a second FIR filter to derive second spectral information, the first and the second FIR filters being further configured for delaying the pixel data, multiplying the taps by the delayed pixel data, and accumulating results of multiplying the filter taps by the delayed pixel data to generate a first digitally filtered sequence of pixel data and a second digitally filtered sequence of spectral information, respectively;

computing at least one value corresponding to a focus condition of the region based on the region's extracted pixel data; and computing at least one value corresponding to a scene activity of the region based on the region's extracted pixel data;

a focus condition change detection facility for computing an out-of-focus indicator value based on the scene activity value;

the windowing facility further comprising:

at least one window processing resource for each region of the image, wherein each window processing resource implements a digital filter to process the said extracted pixel sequence to produce a digitally filtered sequence; and a plurality of accumulator units to accumulate each of the said digitally filtered sequences by adding the pixel data in the sequence to a total value representing the sum of all previous pixel data in the sequence, wherein a final accumulated result is a total value computed by the accumulator unit after adding the last pixel data in the digitally filtered sequence;

the windowing facility being further configured for:

computing arithmetic weighted accumulated sum by weighting and summing the final accumulated results of window processing resources; wherein arithmetic weights are partitioned into at least one curve group, and where each curve group is defined by containing exactly one final accumulated result from a window processing resource and associating each final accumulated result with a curve group;

the focus condition change detection facility is configured for computing two sets of intermediate results for an out-of-focus indicator value using results from at least two of the curve groups by operating on the weighted accumulated sums of each curve group, wherein:

the first set of intermediate results is computed by taking the difference between two predetermined weighted accumulated sums from the same curve group;

the second set of intermediate results is computed by dividing two predetermined weighted accumulated sums from the same curve group; the out-of-focus indicator is computed by a threshold detection facility that performs logical operations on four sets of values, wherein the four sets of values comprise two sets of intermediate results from a current image and two sets of intermediate results from a previous image; and a tracking state-machine for computing a direction value and a magnitude value for adjusting and repositioning the optical system from a current position, based on the computed focus condition value and the out-of-focus indicator value.

2. The apparatus of claim 1, wherein the tracking state-machine's computations of the direction value and the magnitude value comprise:

storing the focus condition values of previous positions, where:

in a first mode, the focus condition values of the two previous consecutive positions are stored;

in a second mode, the focus condition values of a position having the best focus quality is stored and the other values are discarded; and in a third mode, all stored focus condition values are discarded;

comparing the current focus condition values to the stored focus condition values and determining a desired position for adjusting the optical system, wherein the direction value and the magnitude value are computed based on the stored focus condition values and the previous direction and magnitude values;

stopping the focus adjustment when a minimum magnitude quantity is reached and the focus condition is determined to be more optimal than any stored previous focus condition; and restarting the focus adjustment when the out-of-focus indicator value signifies an out-of-focus situation.

3. The apparatus of claim 1, wherein an image region is specified by providing the windowing facility its location and size, and wherein the regions may overlap.

4. The apparatus of claim 1, wherein the windowing facility comprises at least one main window processing resource and one secondary window processing resource, and wherein:

the main window processing resource is dedicated to video auto-focusing applications;

the secondary window processing resource is dedicated to image auto-focusing applications; and subsequent processing of the main window processing resource results and the subsequent processing of the secondary window processing resource results are performed independently.

5. The apparatus of claim 4, further comprising a mode to select between the said main window processing resource and the said secondary window processing resource as an active processing resource in the said windowing facility.

6. The apparatus of claim 1, wherein a set of digital filter coefficients used in each said digital FIR filter is selected from one or more predetermined sets of digital filter coefficients.

7. The apparatus of claim 1, wherein arithmetic weights can be updated for each new image.

8. The apparatus of claim 1, wherein the mentioned processes are programmed into at least one integrated circuit of the digital imaging device.

9. The apparatus of claim 1, wherein window processing resources operate on one pixel sequence from a single readout of the image.

* * * * *

UNITED STATES PATENT AND TRADEMARK OFFICE
CERTIFICATE OF CORRECTION

| | | |
|---|---|---|
| PATENT NO. | : 7,589,781 B2 | Page 1 of 1 |
| APPLICATION NO. | : 11/044137 | |
| DATED | : September 15, 2009 | |
| INVENTOR(S) | : Huang | |

It is certified that error appears in the above-identified patent and that said Letters Patent is hereby corrected as shown below:

Col. 7, line 21, delete "away" and replace with -- array --.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,589,781 B2  Page 1 of 1
APPLICATION NO. : 11/044137
DATED : September 15, 2009
INVENTOR(S) : Xiaolin Huang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-first Day of September, 2010

David J. Kappos
*Director of the United States Patent and Trademark Office*